US005474372A

United States Patent [19]
Jung

[11] Patent Number: 5,474,372
[45] Date of Patent: Dec. 12, 1995

[54] FRONT DOOR OPENING/CLOSING DEVICE FOR A TELEVISION RECEIVER

[75] Inventor: Nak M. Jung, Seoul, Rep. of Korea

[73] Assignee: Daewoo Electronics Co. Ltd., Seoul, Rep. of Korea

[21] Appl. No.: 322,499

[22] Filed: Oct. 14, 1994

[30] Foreign Application Priority Data

Oct. 15, 1993 [JP] Japan ................................. 93-21427

[51] Int. Cl.⁶ ................................................. A47B 81/06
[52] U.S. Cl. ........................... 312/7.2; 292/221; 292/227; 312/319.2
[58] Field of Search ................... 312/7.2, 319.2, 312/328; 292/221, 227, 224; 49/379, 386; 220/2.1 A, 2.3 R, 2.3 A

[56] References Cited

U.S. PATENT DOCUMENTS

| | | | |
|---|---|---|---|
| 1,339,492 | 5/1920 | Belden | 292/221 |
| 2,059,479 | 11/1936 | North | 292/221 X |
| 2,266,119 | 12/1941 | Jacobi | 292/227 |
| 2,301,282 | 11/1942 | Jacobi | 292/227 |
| 2,454,926 | 11/1948 | Jacobi | 292/221 X |
| 5,275,456 | 1/1994 | Ishii et al. | 312/319.2 X |

*Primary Examiner*—Kenneth J. Dorner
*Assistant Examiner*—Rodney B. White
*Attorney, Agent, or Firm*—Lowe, Price, LeBlanc & Becker

[57] ABSTRACT

Disclosed is a door opening/closing device having a simple construction by which a front door of a television receiver can be opened/closed easily, noise and impact can be prevented in the course of opening/closing the front door, and reliable opened and closed states of the front door are guaranteed. In the device, latch hook of a hook lever is engaged with a latch plate of a front door when the front door is closed. When a button is pressed, an actuator rod pushes a lever arm to pivot the hook lever, so that the engagement between the latch hook and the latch plate is unlocked, and the front door is opened by the biasing force of a first spring. When the front door is pivoted about hinge pins and pressed by hands, the latch plate slides along an inclined surface of the latch hook and is engaged again with the latch hook, and then the front door is closed again.

3 Claims, 5 Drawing Sheets

FRONT DOOR OPENING/CLOSING DEVICE FOR A TELEVISION RECEIVER

BACKGROUND OF THE INVENTION

1. Field of the Invention

The present invention relates to a television receiver, and more particularly to a front door opening/closing device for a television receiver which has a simple construction, and by which a front door of a television receiver can be opened/closed easily, a noise and impact in the course of opening/closing the front door can be prevented, and a reliable opened/closed state of the front door is guaranteed.

2. Prior Arts

Generally, a television receiver has a control part which controls functions such as ON/OFF, volume, etc., of the television receiver, and which is provided at an appropriate position of a television receiver body regardless of a separate remote controller.

FIG. 1 shows a perspective view of a television receiver at a lower portion of which the control part having the above described control function is provided. As shown, a front door for preventing the external impact to and the dirt-intrusion into the control part and thereby the deterioration of the function of the control part is disposed at the front of the control part.

Opening/closing devices of various types have been developed to ensure the opening/closing of the conventional front door of the television receiver having such functions. FIGS. 5 and 6 respectively show a schematic partial views for illustrating parts of conventional front door opening/closing devices for a television receiver as a result of the above described development.

First, the front door opening/closing device for a television receiver shown in FIG. 5 has a control part 10 pivotally disposed at a portion of a front cover of the television receiver by a hinge pin 18, a button 11 supported on the front cover of the television receiver by a spring 12, an actuator rod 13 connected to button 11, a connecting rod 15 hingedly connected to actuator rod 13, and a hook 19 having one end connected incorporate with rotation shaft 17 at a right angle thereto and the other end engaged with control part 10.

In the front door opening/closing device, the front surface 14 of the control part is hidden in the cover as shown by the solid lines in FIG. 5 when the control part is closed. When button 11 is pressed, actuator rod 13 pushes one end of connecting rod 15, and accordingly rotation shaft 17 and hook 19 rotate counterclockwise.

In this case, hook 19 and control part 10 are disengaged from each other, and accordingly control part 10 pivots about hinge pin 18 to expose the front surface thereof outward as shown by the broken lines in FIG. 5. Again, when control part 10 is pivoted clockwise to be engaged with hook 19 by hands, control part 10 is closed.

The construction of the front door opening/closing device as described above is very complicate, and thereby the manufacture of the device is relatively difficult and the manufacturing cost thereof is relatively expensive. Further, because the control part is made to be rotatable, the connection between the control part and operation circuits of the television receiver for receiving control signals therefrom is difficult to be made and is apt to be down.

FIG. 6 shows another front door opening/closing device for a television receiver. In the device, when a button 23 is pressed, a hook 25 of a front door 21 having been engaged with a button 23 is guided along a protrusion 27 to be disengaged therefrom, so that front door 21 is pivoted counterclockwise to be opened. Again, when hook 21 and button 23 are engaged with each other by pivoting front door 21 clockwise by hands, front door 21 is closed. However, in the device shown in FIG. 6, protrusion 27 and hook 25 are apt to be broken because they are of cantilever beam types. Further, the device may have a bad effect on the appearance of the television receiver, because protrusion 27 is exposed when the door is opened.

SUMMARY OF THE INVENTION

The present invention has been made to overcome the above described disadvantages of the conventional front door opening/closing devices, and accordingly it is an object of the present invention to provide a door opening/closing device which has a simple construction, and by which a front door of a television receiver can be opened/closed easily, noise and impact due to an abrupt opening/closing of the front door can be prevented, and reliable opened and closed states of the front door is guaranteed.

To achieve the above object, the present invention provides a front door opening/closing device for a television receiver comprising:

a control part disposed under a screen of the television receiver;

a front door hingedly assembled with the control part so as to pivot in such a manner to cover a front surface of the control part, the front door including a latch plate at a right end thereof;

a support part including a base plate having a guide hole defined at a center thereof and a first, a second and a third and a fourth stopper holes at four corners thereof, a bracket disposed between the base plate and the control part, the bracket having a lever hole at an inner upper portion thereof in a vicinity of the first stopper hole, and a hook lever having a latch hook engaged with the latch plate, a lever arm extending at a right angle from the latch hook, and a pivot pin therebetween supported in the lever hole by a second spring, the hook lever being disposed in such a manner to pivot between the lever hole and the first stopper hole about the pivot pin; and a button including an actuator rod extending inward from a middle portion of an inner surface of the button through the guide hole to be in contact with the lever arm, a first, a second, a third and a fourth stopper pins extending inward from four corners of the inner surface of the button through the first, the second, the third and the fourth stopper holes respectively, and a third spring surrounding the actuator rod between the base plate and the button.

Preferably, the control part includes a first damper gear at a left end thereof, and the front door further includes a second damper gear disposed at a left end thereof to be engaged with the first damper gear to thereby damp an opening/closing operation of the front door.

In the front door opening/closing device for a television receiver of the present invention, the latch hook of the hook lever is engaged with latch plate of the front door when front door is closed. When the button is pressed, the actuator rod pushes the lever arm to pivot the hook lever. In this case, the engagement between the latch hook and the latch plate is unlocked, and accordingly the front door is opened by the biasing force of the first spring disposed between the control part and the front door. The button is returned to its initial position by the third spring, and then is maintained in the position by the engagements between the stopper holes and the stopper pins. Further, the hook lever is returned to its initial position by a biasing force of the second spring. The first and second dampers engaged with each other at the left ends of the control part and the front door prevent the abrupt opening/closing of the front door.

When the front door is pivoted about the hinge pins and pressed by hands, the latch plate slides along an inclined surface of latch hook and then is engaged again with latch hook.

BRIEF DESCRIPTION OF THE DRAWINGS

The above objects and other advantages of the present invention will become more apparent by describing in detail a preferred embodiment thereof with reference to the attached drawings in which.

DESCRIPTION OF THE PREFERRED EMBODIMENT

Hereinafter, the present invention will be described in detail with reference to the drawings.

Figure 1:
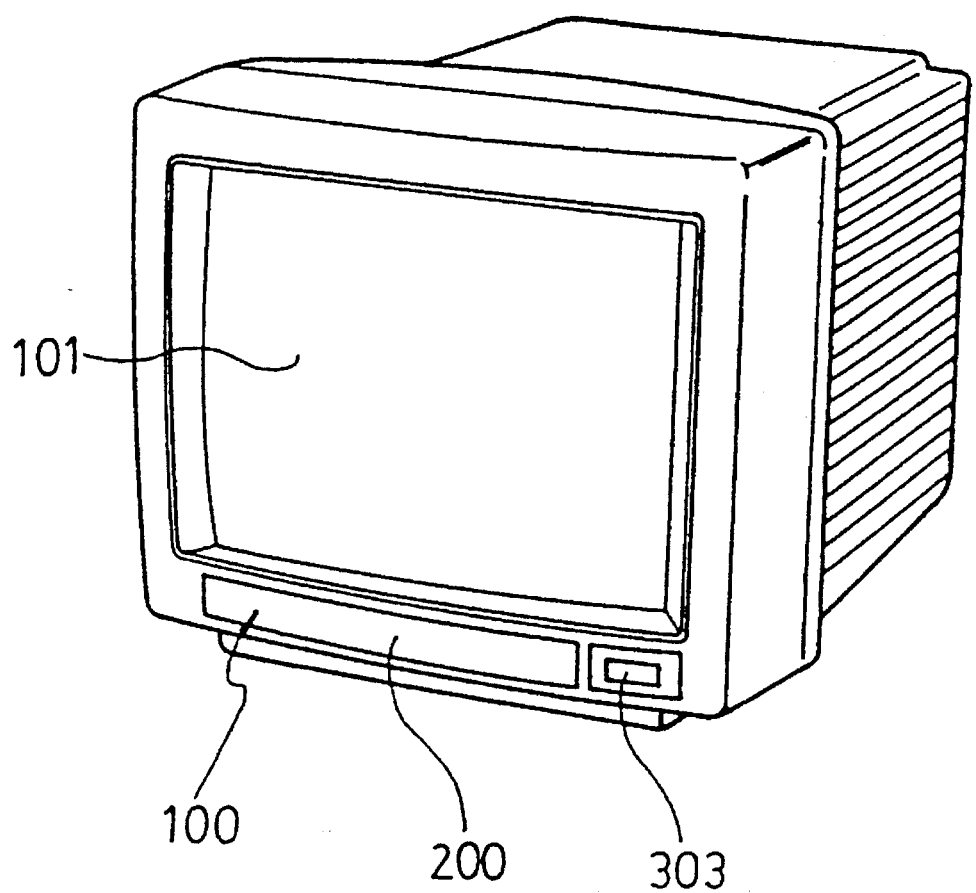
FIG. 1 is a schematic perspective view of a television receiver having a front door opening/closing device according to one embodiment of the present invention.

FIG. 1 is a schematic perspective view of a television receiver having a front door opening/closing device according to one embodiment of the present invention. As shown in FIG. 1, a control part 100 is provided under a screen 101 of the television receiver, and a front door 200 for protecting control part 100 is disposed at the front of control part 100.

Figure 2:
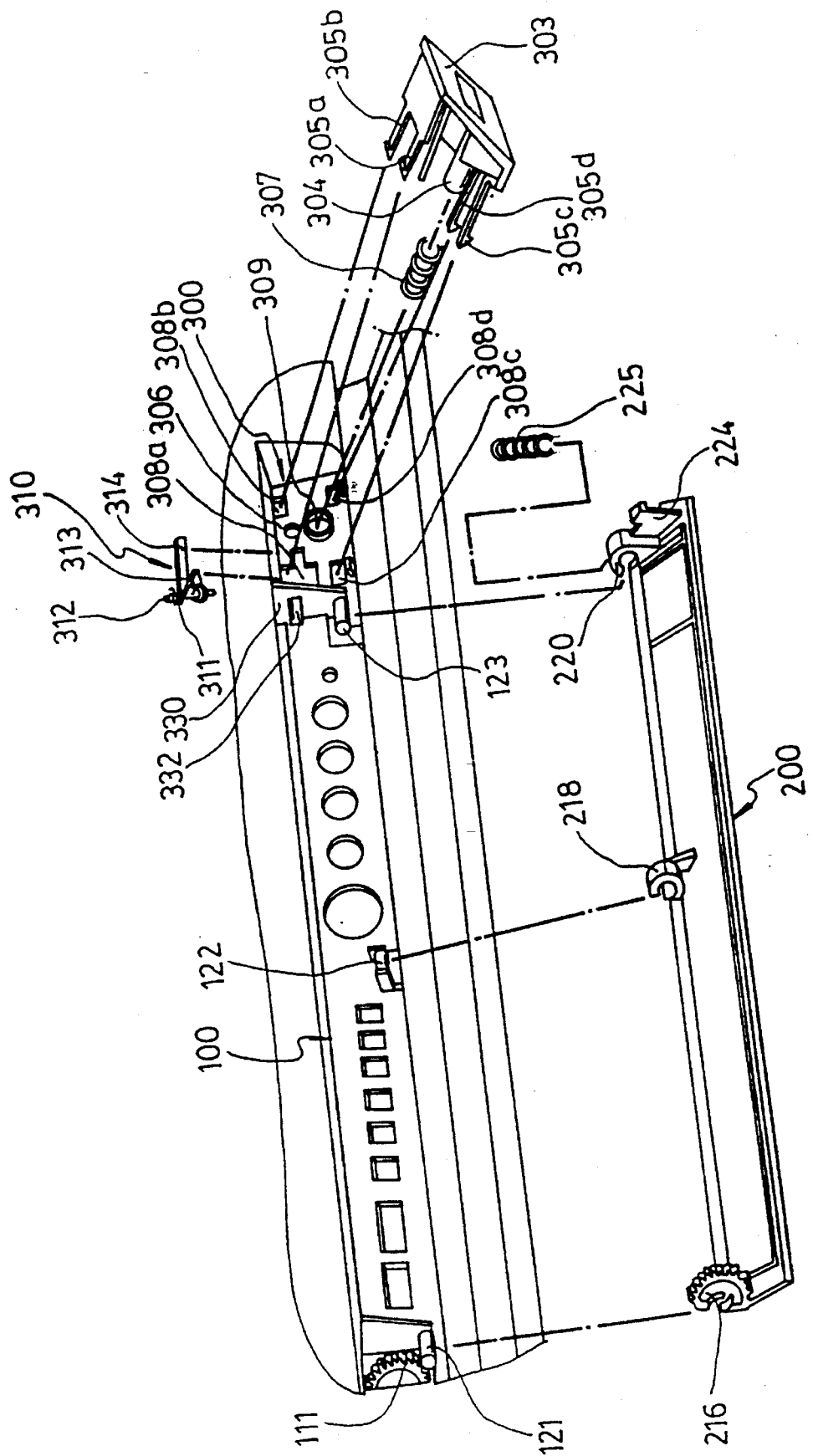
FIG. 2 is an exploded perspective view of the front door opening/closing device included in the television receiver as shown in FIG. 1.

Referring to FIG. 2 showing an exploded perspective view of a partly broken-away front door opening/closing device for a television receiver according to the embodiment shown in FIG. 1, the device includes a control part 100 provided under television screen 101, a front door 200 for covering control part 100 at the front of control part 100, and a support part 300 and a button 303 for opening/closing front door 200. Control part 100 has a first, second, and third hinge pins 121, 122, and 123 respectively disposed at the left, middle, and right lower portions thereof, and a first damper gear 111 at the upper part of first hinge pin 121.

Front door 200 has a second damper gear 216 at the left end of the inner surface thereof, in which first hinge pin 121 is inserted and which is engaged with first damper gear 111 to damp the opening/closing operation of front door 200. A first and second bosses 218 and 220, in which second and third hinge pins 122 and 123 are respectively inserted, are disposed respectively at the middle and right lower portions of the inner surface of front door 200. A first spring 225 surrounding second boss 220 is disposed between control part 100 and front door 200, so that a biasing force in such a direction to open front door 200 is applied always to front door 200.

A latch plate 224 is provided above second boss 220 at the inner surface of front door.

Support part 300 has a base plate 306, and a bracket 330 disposed between base plate 306 and control part 100.

A lever hole 332 is formed at an inner upper portion of bracket 330, and a hook lever 310 is disposed in lever hole 332. A guide hole 309 is formed at the middle, and a first, a second, a third and a fourth stopper holes 308a, 308b, 308c and 308d are formed at the four corners of base plate 306, first hole 308a being disposed in the vicinity of lever hole 332.

Hook lever 310 has a latch hook 313 engaged with latch plate 224, a lever arm 314 extending at a right angle from latch hook 313, and a pivot pin 312 therebetween. Pivot pin 312 is supported in lever hole 332 through a second spring 311, so that hook lever 310 can pivot between lever hole 332 and first stopper hole 308a with pivot pin 312 as the pivoting center.

Meanwhile, button 303 has an actuator rod 304 and a first, a second, a third and a fourth stopper pins 305a, 305b, 305c and 305d extending inward respectively from the center and four corners of the inner surface thereof. Actuator rod 304 is inserted into guide hole 309, and first, second, third and fourth stopper pins 305a, 305b, 305c and 305d into first, second, third and fourth stopper holes 308a, 308b, 308c and 308d. A third spring 307 surrounding actuator rod 304 is disposed between base plate 306 and button 303, so that a biasing force in such a direction to push away button 303 is always applied to button 303.

Hereinafter, the operation of the front door opening/closing device for a television receiver having the above construction according to the embodiment of the present invention will be described.

Figure 3:
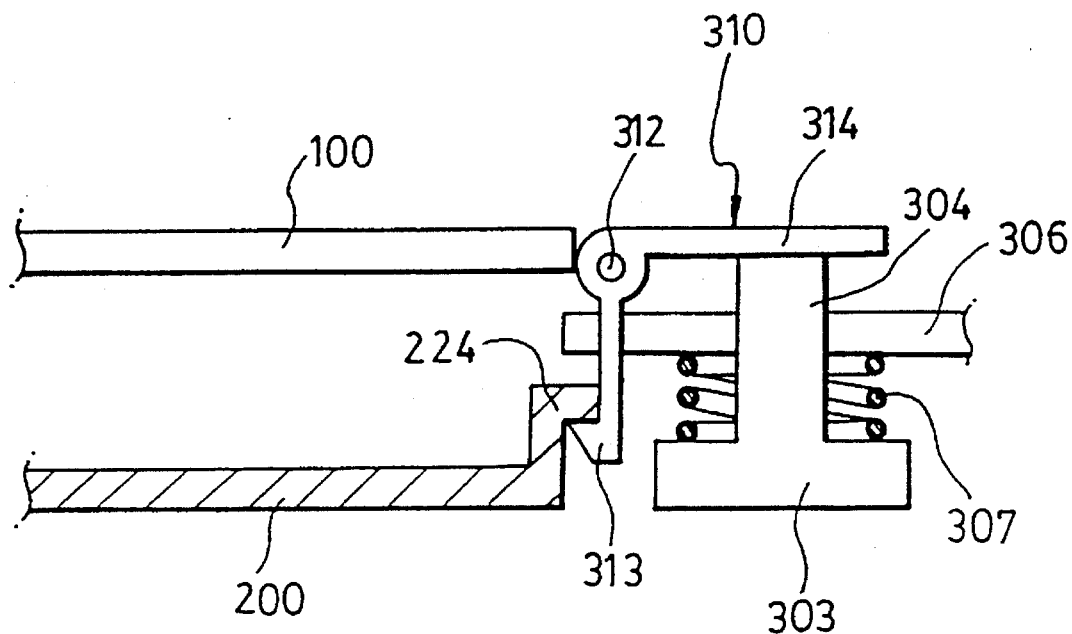
FIG. 3 is a partial view of a part of the front door opening/closing device shown in FIG. 2 when the front door is closed.

First, latch hook 313 of hook lever 310 is engaged with latch plate 224 of front door 200 as shown in FIG. 3 when front door 200 is closed.

Figure 4:
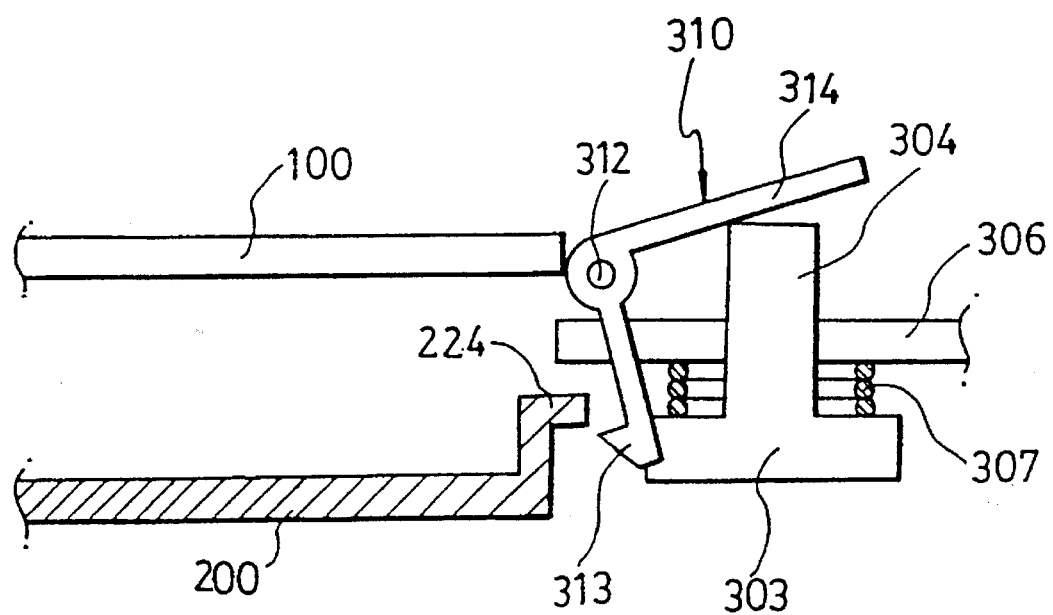
FIG. 4 a partial view of a part of the front door opening/closing device as shown in FIG. 2 when the front door is opened.
Figure 5:
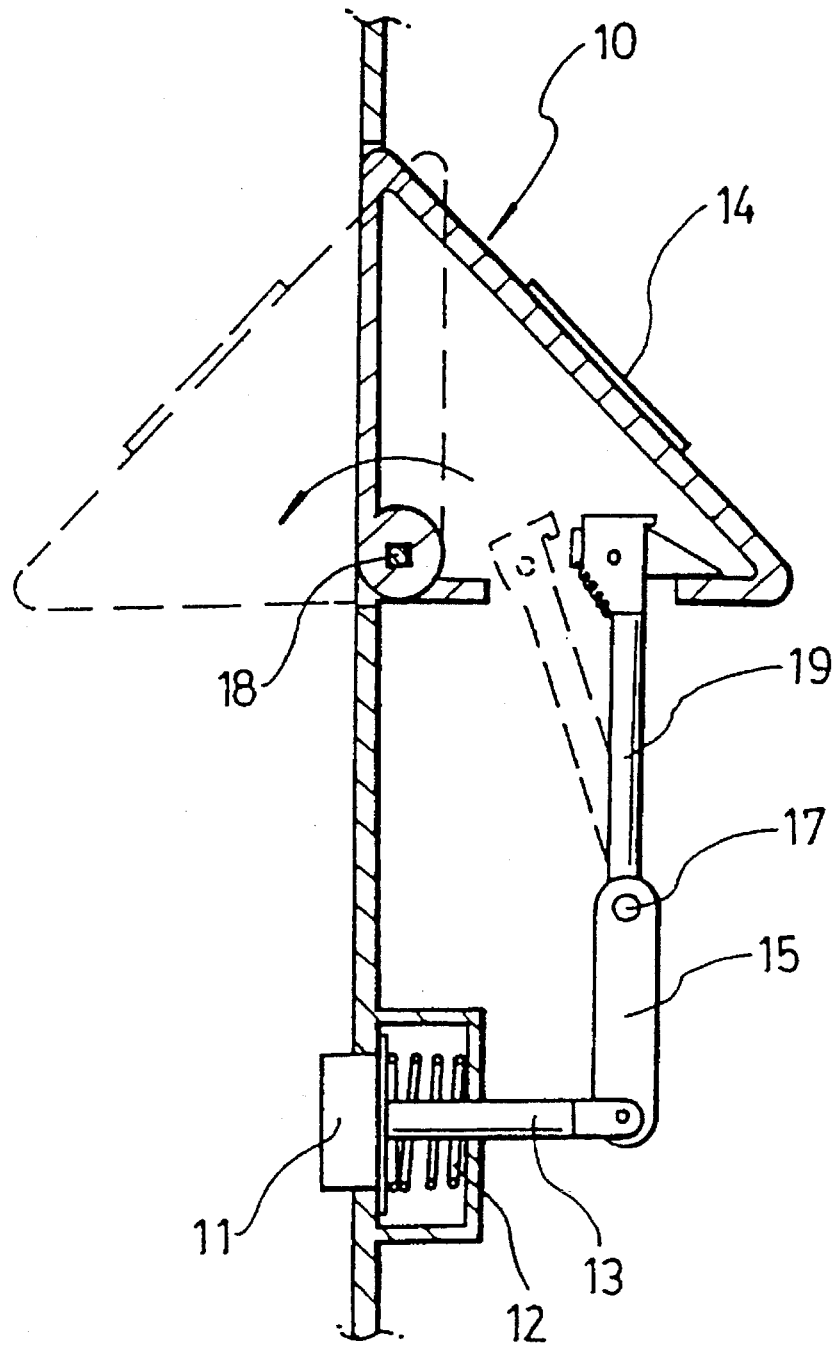
FIGS. 5 and 6 are partial views of parts of conventional front door opening/closing device for a television receiver.
Figure 6:
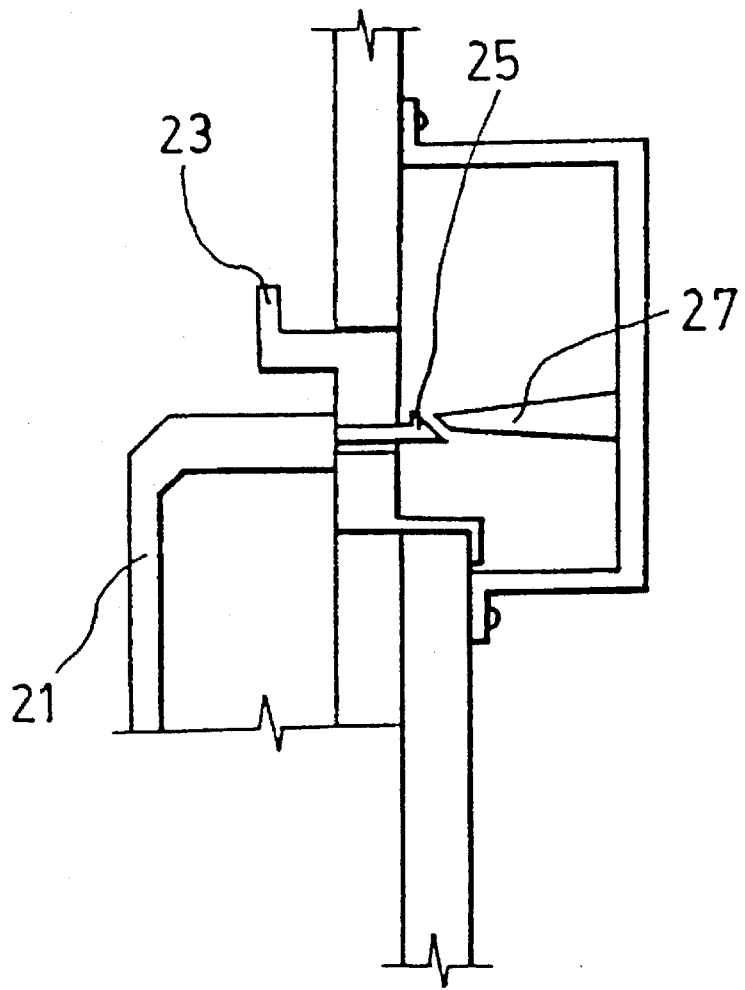

Then, when button 303 is pressed, actuator rod 304 pushes lever arm 314 to pivot hook lever 310 as shown in FIG. 4. In this case, the engagement between latch hook 313 and latch plate 224 is unlocked, and accordingly front door 200 is opened by the biasing force of first spring 225 disposed between control part 100 and front door 200. Button 303 is returned to its initial position by third spring 307, and then is maintained in the position by the engagements between stopper holes 308a, 308b, 308c and 308d and stopper pins 305a, 305b, 305c and 305d. Further, hook lever 310 is returned to its initial position by a biasing force of second spring 311. First and second dampers 111 and 211 engaged with each other at the left ends of control part 100 and front door 200 prevent the abrupt opening/closing of front door 200.

When front door 200 is pivoted about hinge pins 121, 122, and 123 and pressed by hands, latch plate 224 slides along an inclined surface of latch hook 313 and then is engaged again with latch hook 313 as shown in FIG. 3. Then, front door 200 is closed again as shown in FIG. 1.

As described above, a door opening/closing device which has a simple construction, and by which a front door of a television receiver can be opened/closed easily, noise and impact due to an abrupt opening/closing of the front door can be prevented, and reliable opened and closed states of the front door are guaranteed, is provided according to the present invention.

Further, a door opening/closing device, the manufacture of which is easy and the manufacturing cost of which is not expensive due to the simple construction thereof, is provided.

It is understood by those skilled in the art that the foregoing description is a preferred embodiment of the disclosed device and that various changes and modifications may be in the invention without departing from the spirit and scope thereof.

What is claimed is:

1. A front door opening/closing device for a television receiver comprising:

a control part adapted to be disposed under a screen of the television receiver;

a front door hingedly assembled with the control part so as to pivot in such a manner to cover a front surface of the control part, the front door including a latch plate at a right end of the front door;

a support part including a base plate having a guide hole defined at a center of the base plate and a first, a second, a third and fourth stopper holes at four corners of the base plate, a bracket disposed between the base plate and the control part, the bracket having a lever hole defined at an inner upper portion of the bracket in a vicinity of the first stopper hole, and a hook lever having a latch hook engaged with the latch plate, a lever arm extending at a right angle from the latch hook, and a pivot pin therebetween supported in the lever hole by a second spring, the hook lever being disposed in such a manner to pivot between the lever hole and the first stopper hole about the pivot pin; and a button including an actuator rod extending inward from a middle portion of an inner surface of the button through the guide hole to be in contact with the lever arm, a first, a second, a third and a fourth stopper pins extending inward from four corners of the inner surface of the button through the first, the second, the third and the fourth stopper holes respectively, and a third spring surrounding the actuator rod between the base plate and the button.

2. A front door opening/closing device for a television receiver as claimed in claim 1, wherein the control part includes a first damper gear at a left end of the control part, and the front door further includes a second damper gear disposed at a left end of the front door to be engaged with the first damper gear to thereby damp an opening/closing operation of the front door.

3. A front door opening/closing device for a television receiver comprising:

a control part adapted to be disposed under a screen of the television receiver and including a first, a second, and a third hinge pins respectively disposed at a left, a middle, and a right lower portions of the control part, and a first damper gear disposed above the first hinge pin at a left end of the control part;

a front door including a second damper gear, in which the first pin is inserted, disposed at a left end of an inner surface of the front door to be engaged with the first damper gear, a first and a second bosses, in which the second and third hinge pins are inserted, disposed respectively at a middle and a right lower portions of an inner surface of the front door, a first spring surrounding the second boss between the control part and the front door so as to apply always a biasing force for opening the front door, and a latch plate disposed above the second boss at the inner surface of the front door;

a support part including a base plate having a guide hole defined at a center of the base plate and a first, a second, a third and a fourth stopper holes defined at four corners of the base plate, a bracket disposed between the base plate and the control part, the bracket having a lever hole at an inner upper portion of the bracket in a vicinity of the first stopper hole, and a hook lever having a latch hook engaged with the latch plate, a lever arm extending at a right angle to the latch hook, and a pivot pin therebetween supported in the lever hole by a second spring, the hook lever being disposed in such a manner to pivot between the lever hole and the first stopper hole about the pivot pin; and a button including an actuator rod extending inward from a middle portion of an inner surface of the button through the guide hole to be in contact with the lever arm, a first, a second, a third and a fourth stopper pins extending inward from four corners of the inner surface of the button through the first, the second, the third and the fourth stopper holes respectively, and a third spring surrounding the actuator rod between the base plate and the button.

* * * * *